United States Patent
Kelley, Jr. et al.

[15] 3,654,541
[45] Apr. 4, 1972

[54] THYRISTOR STATE SENSOR

[72] Inventors: Fred W. Kelley, Jr., Media, Pa.; Georges R. E. Lezan, Cherry Hill, N.J.

[73] Assignee: General Electric Company

[22] Filed: June 26, 1969

[21] Appl. No.: 836,765

[52] U.S. Cl. ................................. 321/13, 318/257, 321/27, 323/24
[51] Int. Cl. ............................ H02m 1/18, H02p 1/22
[58] Field of Search ......................... 321/5, 11–13, 27, 321/45, 8; 318/237, 207; 307/243, 252; 340/253 E; 323/24

[56] References Cited

UNITED STATES PATENTS

| 3,526,812 | 9/1970 | Steen et al. | 321/14 X |
| 3,539,900 | 11/1970 | Chausse et al. | 321/45 R |
| 3,550,110 | 12/1970 | Mayer | 340/253 E |
| 3,551,782 | 12/1970 | Maynard | 321/13 |
| 3,332,001 | 7/1967 | Schwarz | 321/11 |
| 3,502,957 | 3/1970 | Fried et al. | 321/11 |
| 3,525,030 | 8/1970 | Hammond et al. | 321/5 |
| 3,320,515 | 5/1967 | Amato et al. | 321/130 X |
| 3,478,257 | 11/1969 | Kyr et al. | 321/11 |

FOREIGN PATENTS OR APPLICATIONS

| 1,175,356 | 8/1964 | Germany | 318/257 |
| 1,336,303 | 7/1963 | France | 321/45 |

Primary Examiner—William H. Beha, Jr.
Attorney—J. Wesley Haubner, Albert S. Richardson, Jr., Frank L. Neuhauser, Oscar B. Waddell and Melvin M. Goldenberg

[57] ABSTRACT

To sense when a thyristor is conducting, voltage detecting means is connected in parallel with the thyristor for emitting an indicating signal whenever the instantaneous magnitude of voltage across the thyristor exceeds a predetermined threshold level which is higher than the voltage drop across the thyristor when conducting, and logic means is provided for producing a predetermined output signal in response to the absence of said indicating signal and, concurrently, the act of either triggering the thyristor or producing the output signal.

15 Claims, 6 Drawing Figures

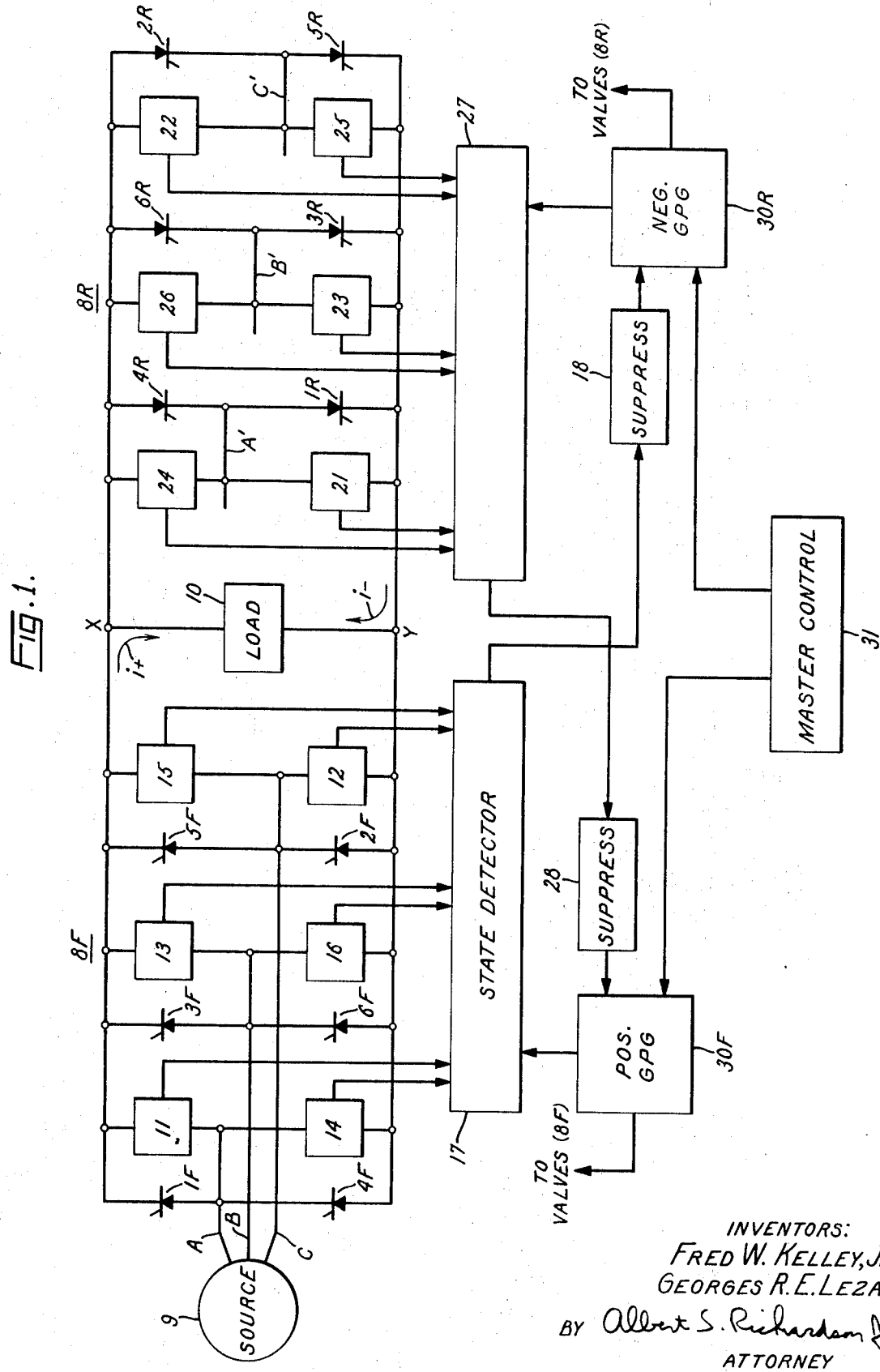

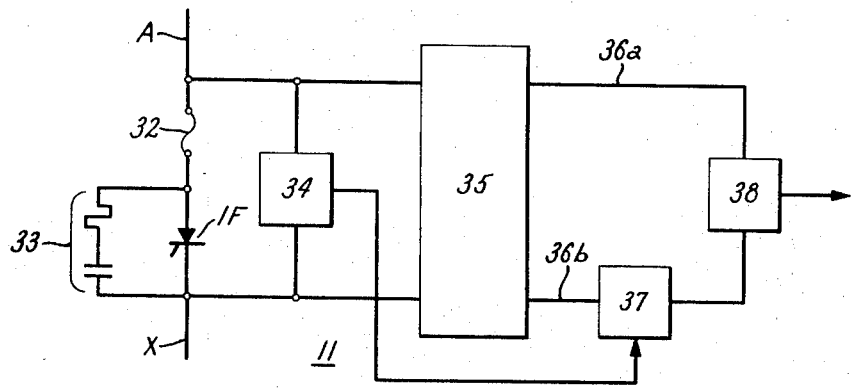
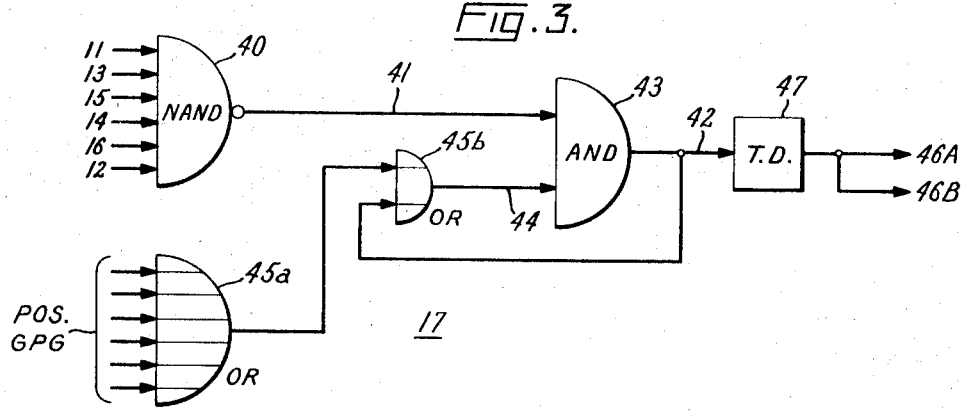
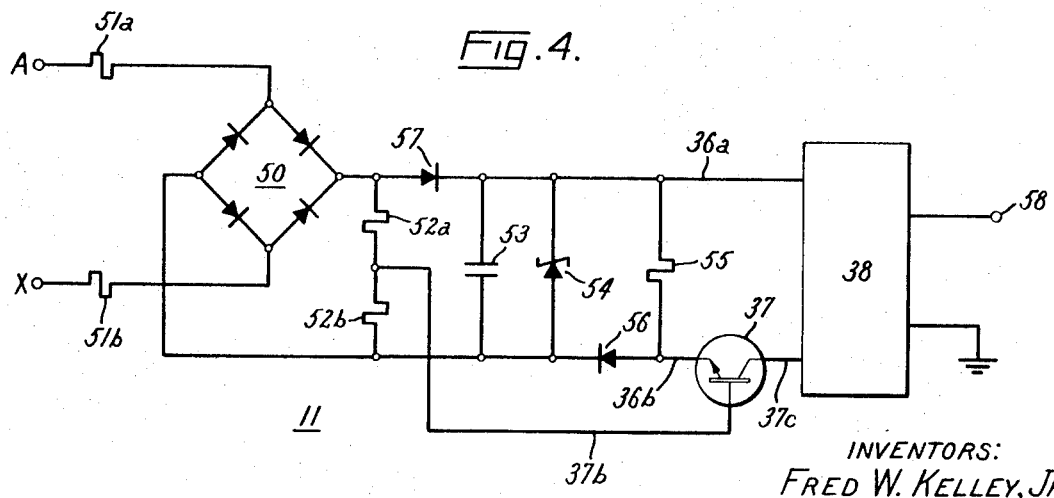

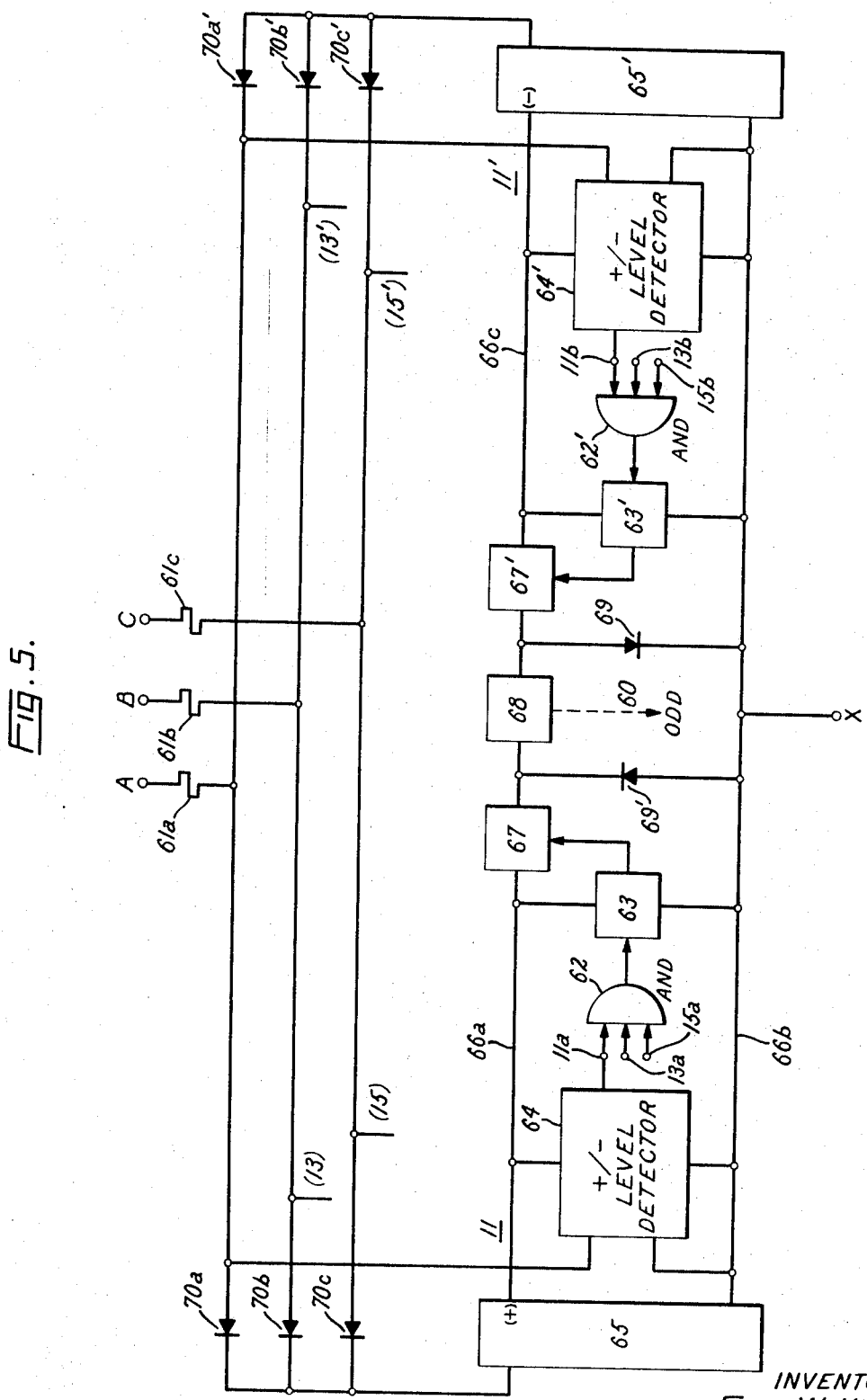

THYRISTOR STATE SENSOR

This invention relates to means for sensing whether or not an electric valve is in a conducting state, and more particularly it relates to means for monitoring the state of a group of valves that are cooperatively arranged and operated as a "bridge" in high-power conversion apparatus.

There are many known power conversion circuits for changing the form of electric power from direct current to alternating current, from alternating current to unipolarity or bipolarity direct current, or from polyphase alternating current of fundamental frequency to single-phase or polyphase alternating current of a different frequency. Such apparatus are popularly referred to as inverters, rectifiers, reversing rectifiers, cycloconverters, or direct frequency changers (or multipliers). In each case the conversion is accomplished by appropriately controlling a plurality of periodically conducting, sequentially fired electric valves that are interconnected in a bridge configuration between d-c and a-c terminals, the latter being connected by means of a power transformer to a polyphase system of alternating voltage with which the valve firings are synchronized. In modern practice each valve typically comprises one or more solid-state gate-controlled switching components known as semiconductor controlled rectifiers or thyristors.

In operation, such a valve has a non-conducting or blocking state, in which it presents very high impedance to the flow of current, and a conducting or turned-on state in which it freely conducts forward current with only a relatively slight voltage drop. It can be switched abruptly from the former state to the latter by the concurrence of a forward bias on its main electrodes (anode at a positive potential with respect to cathode) and a control or trigger signal on its gate. The time at which the valve is turned on, measured in electrical degrees from a cyclically recurring instant at which its anode voltage first becomes positive with respect to cathode, is known as the "firing angle." The magnitude of the output voltage of the bridge can be varied by retarding or advancing the firing angle as desired.

Once turned on, a valve will continue conducting until "forward current" is subsequently reduced below a given holding level by the action of the external circuit in which the valve is connected. This turn-off process can be referred to generally as "commutation." The present invention is particularly useful in conjunction with conversion apparatus wherein a-c line or load voltage commutation is relied on to cyclically extinguish forward current in each valve in turn upon firing a related incoming (relieving) valve in the same bridge. Immediately after each conducting period, the valve will be subjected to reverse voltage (anode at a negative potential with respect to cathode) for a certain interval which is followed by the reapplication of forward anode-to-cathode voltage, and on receipt of a subsequent trigger signal the valve is fired once again.

In certain types of electric power conversion apparatus, there is a need to monitor the conducting state of individual thyristors or of thyristor bridges. See, for example, U.S. Pat. No. 2,385,214—Livingston, No. 3,152,297—Peaslee, No. 3,308,370—Britten et al., and No. 3,431,479—Joslyn. In each of these cases the monitoring means is used to lock out or disable the control circuits associated with a first valve or group of coordinated valves when current is present in a different valve or group of valves even though the control circuits are commanding conduction by the first group, whereby undesirable circulating currents are avoided. Heretofore current transformers or the like have been used to sense the presence of current for this purpose. But such current responsive devices have certain recognized shortcomings, particularly in high-power apparatus where they are required to accurately distinguish between zero current and the presence of any current from a low holding level (e.g., less than 0.02 ampere) to a high full-load peak (e.g., 1,000 amperes or more). The threshold sensitivity of practical current sensing devices with which we are presently familiar is inadequate and is usually masked by the noise level in the associated measuring circuit. Thus an area of potential uncertain response is present, and it has heretofore been necessary to accommodate this uncertainty by introducing appreciable time delay. But the time delay itself is undesirable because of the long deadbands and consequent harmonics that result in the output waveforms of the conversion apparatus. Feedback techniques for deadband reduction are generally not a satisfactory solution to this problem.

Accordingly, a general objective of our invention is to provide improved means for sensing the conducting state of an electric valve, which means is characterized by unusually high sensitivity, accuracy, and speed of response.

Another object is to provide an improved combination of voltage detection and logic means for determining when a valve can be properly triggered and when it cannot.

In carrying out the invention in one form, we provide means for detecting the absence of voltage across a conducting valve rather than the presence of current through it. Preferably the voltage detecting means is arranged to emit an indicating signal whenever the instantaneous magnitude of voltage exceeds a predetermined threshold level which is higher than the maximum forward drop across the valve while conducting, and it is associated with logic means for producing the desired disabling signal in response to the absence of this indicating signal. To avoid erroneous production of disabling signals every time the voltage impressed on a non-conducting valve crosses zero, the logic means is so arranged that a disabling signal is initially produced only when the absence of the indicating signal coincides with the generation of a gate pulse for triggering the valve, and the disabling signal is then sustained until the indicating signal next reappears. Preferably the termination of the disabling signal is delayed after the indicating signal reappears for an interval slightly longer than the "turn-off time" of the valve, which interval is substantially shorter than the delays typically used in the above-mentioned prior art.

In one embodiment of our invention, the voltage detecting means comprises the combination of level detecting means conductively connected across the valve and operative to provide an actuating signal when the instantaneous magnitude of the voltage across the valve exceeds the aforesaid threshold level, a capacitor connected by means of a charging circuit across the valve for providing a continuously available control voltage, means energizable by the control voltage for emitting the indicating signal which is electrically insulated from the control voltage, and switching means controlled by the actuating signal for causing the control voltage to energize the last-mentioned means on operation of the level detecting means. This combination offers the advantage of being a sensitive and self-contained source of an indicating signal that is insulated from the relatively high potentials imposed on a valve in the high-power conversion apparatus herein contemplated, and it is generally useful for detecting the presence of voltage across electric valves wherever such attributes are desired.

The invention will be better understood and its various objects and advantages will be more fully appreciated from the following description taken in conjunction with the accompanying drawings in which:

FIG. 1 is a schematic circuit diagram of two three-phase, double-way, six-pulse bridges interconnected to form a reversing rectifier or cycloconverter type of conversion apparatus with which our state sensing means can be advantageously used in practice;

FIG. 2 is a functional block diagram of one of the voltage detecting means shown as a single block in FIG. 1;

FIG. 3 is a schematic representation of the associated state detector shown in block form in FIG. 1;

FIG. 4 is a schematic circuit diagram of the voltage detecting means shown functionally in FIG. 2;

FIG. 5 is a functional block diagram of voltage detecting means illustrating an alternative embodiment of our invention.

Figure 6:
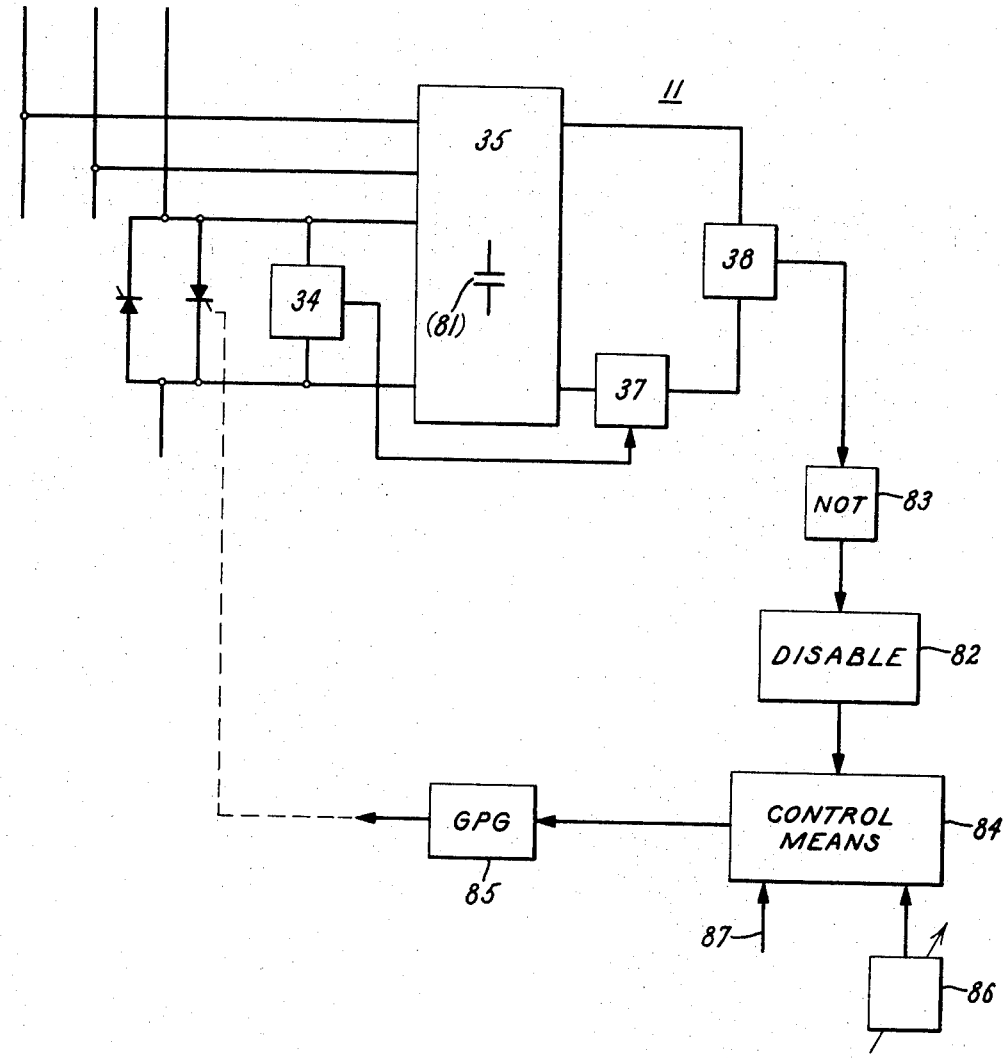
FIG. 6 is a functional block diagram that shows another form in which our invention can be practiced.

For purposes of illustrating one practical application of thyristor state sensors, we have shown in FIG. 1 two duplicate bridges 8F and 8R which are part of electric power conversion apparatus that controls the interchange of power between a source 9 and a load 10. As shown, each of these bridges comprises a group of six identical valves connected in a conventional three-phase double-way, six-pulse configuration between a set of three a-c terminals and a pair of d-c terminals. Alternatively the same valves could be arranged in other known configurations, such as six-phase, single-way, six-pulse bridges. In any event, suitable connections are made between the respective sets of a-c terminals of the bridges 8F and 8R and the source 9. The source 9 comprises a conventional system of three-phase sinusoidal voltage which alternates at a fundamental frequency such as 60 hertz. Usually the conversion apparatus also includes power transformer windings (not shown) for connecting the a-c terminals of the bridges to the source.

As is shown in FIG. 1, the positive d-c terminal of the bridge 8F is connected in common with the negative d-c terminal of the companion bridge 8R to one side X of the load circuit, whereas the negative d-c terminal of bridge 8F and the positive d-c terminal of bridge 8R are commonly connected to another side Y of the same load. Thus the first bridge 8F will supply positive current (i+) from the source 9 to the load 10 for energizing the latter in a "forward" sense, while the other bridge 8R will supply negative current (i−) to the load for energizing it in the opposite or "reverse" sense. Although not shown in FIG. 1, load current conducting reactors are sometimes individually associated with the respective bridges. The load 10 may comprise the armature of a variable speed, reversible d-c motor, or it may include one or more windings of a variable speed, multi-winding a-c motor. Current in the load circuit will typically have a lagging phase relationship with respect to the voltage impressed on terminals X, Y.

The six valves in the positive group or bridge 8F have been identified by the reference characters 1F through 6F, respectively. The cathodes of the odd-numbered valves are connected in common to the positive d-c terminal X of this bridge, and the anodes of the even numbered valves are connected in common to the negative d-c terminal Y. The anode of valve 1F and the cathode of valve 4F are both connected via a first a-c terminal of the bridge 8F to phase A of the alternating voltage source 9. The anode of valve 3F and the cathode of valve 6F are both connected via another a-c terminal to phase B of the source, and the anode of valve 5F and the cathode of valve 2F are both connected via the third a-c terminal to the third phase C of the source. While each of the valves is illustrated by a single symbol, in practice it often comprises a plurality of separate thyristors connected in series and/or in parallel with one another and suitably arranged to operate in unison.

The conversion apparatus includes control means for periodically switching the respective valves of the bridge 8F from blocking states to forward current conducting states. Toward this end, an appropriately timed family of discrete firing signals, hereinafter referred to as gate pulses, is cyclically generated and sequentially applied to the respective control electrodes (gates) of the valves 1F–6F, whereby the valves are triggered in numerical sequence in synchronism with the alternating voltage of the source (a conventional phase rotation A–B–C is assumed), and the flow of power through the bridge 8F is controlled as desired. Triggering means 30F of any suitable design is used for generating the requisite gate pulses and for determining their characteristic firing angle; a circuit advantageously used in practice is disclosed in U.S. Pat. No. 3,095,513—Lezan. The gate pulse distributing circuits between 30F and the respective valves of bridge 8F have been omitted in FIG. 1 for the sake of drawing simplicity.

The six valves in the negative group or bridge 8R have been identified by the reference characters 1R through 6R, respectively, and they are interconnected and arranged similarly to the valves of the companion bridge 8F. Although not shown in FIG. 1, it should be understood that the connections between the a-c terminals A', B', C' of the bridge 8R and the three-phase source 9 can be so arranged that the alternating voltages at these terminals are either in phase or phase displaced with respect to the alternating voltages at the corresponding terminals A, B, C of the bridge 8F. The valve triggering means 30R associated with the bridge 8R is similar in function and operation to the previously described triggering means 30F.

Master control means 31 is provided for alternatively activating the two triggering means 30F and 30R and for retarding or advancing their respective firing angles as desired. Since a detailed disclosure of the master control is not essential to an understanding of the present invention, we will merely point out that the block 31 represents suitable control, regulation, and restraint circuitry to command the proper gate pulse generator 30F or 30R to initiate conduction of the valves of the associated bridge at the proper firing angle to vary the direction and magnitude of current delivered to the load 10 according to a preset or manual program. Once turned on, each valve in turn will continue conducting until forward current therein is decreased to zero by a cyclic commutation process, and each conducting period is immediately followed by an interval of reverse anode-to-cathode voltage across that valve.

In operation there is a possibility that the master control 31 may activate one of the triggering means 30F or 30R before load current has stopped flowing through the opposite bridge, in which event the a-c terminals could be short-circuited by simultaneously conducting valves in the different bridges. To avoid this adversity and the undesirable circulating currents that could result, it is common practice in the relevant art to interlock the trigger means so that operation of 30F is always inhibited or suppressed whenever reverse current (i−) is being conducted in the bridge 8R and so that operation of 30R is always inhibited or suppressed whenever forward current (i+) is being conducted in the bridge 8F. In accordance with our invention, the conducting state of a valve or bridge is sensed by improved means which will now be described.

The state sensing means shown in FIG. 1 for the bridge 8F comprises a plurality of voltage detecting means 11–16 connected across the valves 1F–6F, respectively, and a state detector 17 which is coupled to all of these voltage detecting means and also to the associated triggering means 30F. Each of the voltage detectors 11–16 is designed to transmit an indicating signal to the state detector 17 so long as there is appreciable voltage across the associated valve. The state detector 17 is arranged to respond to the absence of any one of the voltage indicating signals by producing a disabling signal to activate suppression or lockout means 18 which is provided for preventing the triggering means 30R from applying gate pulses to the valves of the bridge 8R. This action is initiated only when the termination of a voltage indicating signal is accompanied by the concurrent generation of a gate pulse by the triggering means 30F, thereby insuring that the absence of the indicating signal is due to a valve actually conducting rather than to a zero crossing of voltage impressed on the valve while in its blocking state.

Similar state sensing means is provided for the bridge 8R. In FIG. 1 the voltage detecting means for the respective valves 1R–6R of this bridge are identified by the reference numbers 21–26, and the associated state detector is shown at 27. The disabling signal that is produced by the state detector 27 when any of the valves in the bridge 8R is in a conducting state is used to activate suppression or lockout means 28, thereby preventing the application of gate pulses by the triggering means 30F to the valves of the bridge 8F.

FIG. 2 shows more details of one leg (1F) of the bridge 8F together with a useful embodiment of the associated voltage detecting means 11. The valve 1F is connected in series with a fuse 32 between the a-c line A and the load terminal X, and it is shunted by a conventional snubber circuit 33 comprising a resistor in series with a capacitor. The voltage detecting means 11 comprises level detecting means 34 conductively connected across the valve as shown, and this level detecting means is operative to provide an actuating signal whenever there is voltage of either polarity across the associated valve and the absolute magnitude of that voltage exceeds a predetermined threshold level. The threshold level is selected to be higher than the voltage drop across the valve when in its forward current conducting state. By way of example, in an 800-volt (peak) 300-amp (average) circuit, the valve might comprise the series combination of two commercially available power thyristors each having a PRV rating of 1,000 volts and an average current rating of 300 amperes. The maximum forward drop across such a valve is less than 3 volts when conducting 1,000 amps and less than 8 volts at 5,500-amp peak surge. In this example, 10 volts would be a practical threshold level at which the level detector 34 operates.

The voltage detecting means 11 also includes means 35 for providing a continuously available control voltage on a pair of conductors 36a, 36b. Preferably the latter means comprises energy storage means connected across the valve 1F so as to be charged by the voltage impressed on the valve during its blocking periods. The advantages of this arrangement will be explained below in connection with the description of FIG. 4. The control voltage conductors 36a, 36b are connected through switching means 37 to means 38 which is arranged when energized to emit the indicating signal of the voltage detector 11. The switching means 37 is controlled by the actuating signal provided by the level detecting means 34, and when the latter operates the switching means causes the control voltage to energize the indicating signal emitting means 38. Consequently an indicating signal, which is electrically insulated by the means 38 from both the actuating signal and the control voltage, will be present so long as the valve 1F is in a blocking state and its main electrodes are subjected to either forward or reverse voltage having an instantaneous magnitude in excess of the aforesaid threshold level.

The indicating signal from the voltage detecting means 11, along with any similar signals emitted by the corresponding voltage detecting means 12-16 which are respectively connected across the other valves of the bridge 8F, is supplied to the state detector 17. The latter component of our state sensing means comprises logic means which can take the form shown functionally in FIG. 3. As is there indicated, one input of the logic means comprises a NAND circuit 40 which receives the various indicating signals from all of the voltage detectors 11-16 and provides a "1" signal at 41 in the absence of one or more of the indicating signals and a "0" signal at 41 whenever all of the indicating signals are contemporaneously present. The latter condition obtains only while all of the valves in the bridge are in their blocking states.

The logic means 17 is arranged to respond to the appearance of a "1" signal at 41 by producing a corresponding signal at 42 if the associated control means is then applying a gate pulse to one of the valves of the bridge 8F. As is symbolically illustrated in FIG. 3, this can be accomplished by effectively connecting between 41 and 42 suitable means 43 for performing an AND logic function. The second input 44 for the AND means 43 is taken from an OR circuit 45a which is coupled to the triggering means 30F so as to provide a "1" signal at 44 during the time that any one of the cyclic family of six "positive" gate pulses is being generated. The operation of 43 initially to produce a "1" signal at 42 is seen to depend upon the contemporaneous states of its two inputs; namely, the presence of a "1" signal at 41 (which indicates the absence of a voltage indicating signal) and concurrently the presence of a "1" signal at 44 (which indicates the generation of a gate pulse). A companion OR circuit 45b interconnecting 42 and 44 performs a seal-in function so that the signal at 42 will not terminate on the subsequent expiration of the gate pulse so long as the NAND circuit 40 continues to maintain a "1" signal at 41. This is desirable because ordinarily the gate pulse width is relatively short, e.g., of the order of 100-200 microseconds or less.

It will now be apparent that a signal begins at 42 of the logic means 17 when the bridge 8F switches from a non-conducting state to a conducting state, as evidenced by the collapse of at least one of the indicating signals emitted by the respective voltage detectors 11-16 and, concurrently, the generation of a gate pulse by the triggering means 30F. The signal at 42 will then continue for so long as any one of the valves 1F-6F is conducting forward current. Later this signal is cleared when the signal at 41 reverts to "0" due to the bridge returning to a nonconducting state. The latter event is marked by a last-conducting valve of the bridge turning off, whereupon reverse voltage abruptly rises across it and the associated voltage detector emits a signal that completes the set of indicating signals transmitted to the NAND circuit 40. Thereafter, while the triggering means 30F is inactive and all of the valves of the bridge 8F remain off, no signal can be produced at 42 even though there is a train of intermittent "1" signals at 41 due to recurrent gaps in the indicating signals corresponding to successive zero crossings of voltages across the turned off valves. Production of spurious signals at 42 on the occasion of zero crossings of voltage will be prevented by the AND logic means 43 in conjunction with the OR circuit 45a which is responsive to the generation of gate pulses for the valves in bridge 8F and, in their absence, withholds any "1" signal for the second input 44 of 43. The duration of each zero crossing is brief, e.g., less than 1.5 electrical degrees, or 70 microseconds on a 60 hertz basis, if the threshold level of the voltage detectors were selected to be 1.25 percent of the peak voltage normally impressed on a blocking valve. Preferably the threshold level of the voltage detectors is approximately the same as the minimum forward bias voltage required to turn on a valve, and the control means is arranged to limit the firing angle so that at full advance ("zero" phase retard) the earliest moment for applying a gate pulse to a valve each cycle occurs after the associated voltage detector has emitted an indicating signal.

In the state detector 17, a "1" signal at 42 causes output signals 46A and 46B to be produced. Preferably the state detector includes suitable time delay means 47 for stretching these output signals so that they begin with a signal at 42 but terminate a predetermined interval of time following the clearance of that signal. The latter delay is selected to be slightly longer than the turn-off time of the valves (e.g., an interval of 500 microseconds or less) and it ensures that at the conclusion of each conducting period of the bridge 8F the last-conducting valve will have sufficient time to fully recover its blocking capability before the output signals 46A and 46B are cleared. One of the output signals 46A is intended to perform a disabling function previously described, for which purpose it activates the suppression means 18 that restrains the triggering means 30R associated with the negative group of valves 1R-6R. The other output signal 46B can be used to indicate that bridge 8F has started conducting.

Returning now to the previously described voltage detector 11, further circuit details of one embodiment thereof are illustrated in FIG. 4. As there shown, the a-c terminals of a full-wave diode bridge 50 are connected via resistors 51a and 51b to the terminals A and X which in turn are respectively connected to the anode and cathode of the valve 1F. Spanning the d-c terminals of the diode bridge 50 are voltage dividing means comprising resistors 52a and 52b and energy storage means comprising a capacitor 53. The capacitor 53 is paralleled by a voltage regulating Zener diode 54 and by a resistor 55 in series with a diode 56. Another diode 57 isolates the voltage divider 52a, 52b from the capacitor 53, whereby the capacitor cannot discharge through the voltage divider during the periodic intervals when the instantaneous magnitude of voltage across the latter is lower than the relatively constant magnitude of voltage maintained by the former.

As is shown in FIG. 4, the control voltage conductors 36a and 36b of the voltage detector are connected to opposite sides of the resistor 55, and the switching means 37 comprises a NPN transistor whose emitter is connected to the conductor 36b and whose base 37b is connected to the juncture of resistors 52a and 52b. The indicating signal emitting means 38 is connected between the collector 37c of this transistor and the control voltage conductor 36a, whereby it is energized by the control voltage whenever the emitter-base junction of the transistor 37 is forward biased. When so energized, the means 38 emits a signal which imposes a relatively low voltage on terminal 58 with respect to ground, and it includes suitable means (not shown) for electrically insulating this signal from the control voltage conductors 36a, 36b whose potential can be substantially above ground. Toward this end, suitable insulation can be provided optically or inductively; for example, in practice the block 38 can comprise an inverter-transformer-rectifier combination. By locating the transformer in the means 38 instead of between the diode bridge 50 and the terminals A, X, we avoid a problem of transformer saturation by a d-c component in the valve voltage.

The indicating signal at terminal 58 is fed to the NAND circuit 40 in the state detector 17 (FIG. 3), whereby, as previously explained, its collapse when valve 1F is triggered from a blocking state to a forward current conducting state results in the production of the disabling signal 46A. Alternatively, the presence of a signal at 58 can be used per se for indication or supervisory purposes if desired. In any event, the presence or absence of the signal at 58 is seen to depend upon whether or not the instantaneous magnitude of voltage between the terminals A and X exceeds a predetermined threshold level. This level is determined by the selection of resistors in the voltage divider 52a, 52b.

For a better understanding of the voltage detector shown in FIG. 4, its operation during a typical period of reverse voltage across the valve 1F will now be reviewed. (The voltage values mentioned in this part of the description are illustrative only, and circuit parameters that will yield the exemplary results are assumed.) So long as the instantaneous magnitude of voltage between terminals A and X is less than about 10 volts, the voltage drop across resistor 52b will not exceed the forward drop across diode 56 by enough to effect actuation of the transistor 37. Once this threshold level of 10 volts is attained, however, the voltage divider 52a, 52b is operative to provide forward bias current in the base circuit 37b of transistor 37, whereupon this transistor begins conducting in the control voltage circuit that interconnects the capacitor 53 and the indicating signal emitting means 38. Consequently the latter means will now produce an indicating signal at terminal 58 until the voltage across the valve 1F subsequently decreases below the threshold level. While the valve voltage is between 10 and 60 volts, the isolating diode 57 continues to be reverse biased and the capacitor 53 sustains the control voltage required for operatively energizing the means 38. Between 60 and approximately 500 volts, the energy used by the means 38 will be supplied jointly by the storage capacitor 53 and by the power circuit to which terminals A and X are connected. The higher the voltage in this range, the greater is the energy contribution of the power circuit and the lesser that of the capacitor. During the remaining portion of the blocking period, when the magnitude of voltage across the valve 1F is between 500 volts and a peak of 800 volts (an interval appreciably longer than one-fourth cycle), sufficient energy is derived from the power circuit to supply all of the requirements of the indicating signal emitting means 38 and also to recharge the capacitor 53. At this time enough energy will be stored in the capacitor to maintain control voltage continuously available during those cyclically recurring intervals of lower or zero voltage across the valve. By charging the energy storage means in this manner, we have provided a self-contained voltage detector that requires no external source of control power other than what is derived from the power circuit to which it is directly coupled.

The details of the above-described thyristor state sensor and its various components can be modified in a number of different ways. For example, if a common set of a-c terminals were shared by the two bridges 8F and 8R shown in FIG. 1, whereby the respective valves 1F–4R, 3F–6R, 5F–2R, etc., are paired in inverse parallel relationship with each other, then the respectively associated voltage detectors could be merged so that one indicating signal per pair is emitted when the two valves of that pair are both in their blocking states and voltage across the pair exceeds the aforesaid threshold level, with each indicating signal in turn being supplied to the NAND circuits 40 in both of the state detectors 17 and 27.

When our voltage detector is used with a pair of inverse-parallel valves, it can advantageously be combined with logic means that is alternatively arranged to disable the associated triggering means in the absence of an indicating signal. This will prevent a gate pulse from being formed prior to a time each cycle when there is forward bias voltage of at least the threshold level across the valve to be fired, whereby premature attempts to initiate conduction are avoided even though the associated control means under some load conditions may command earlier firing. FIG. 6 illustrates one possible embodiment of this modification. By coupling the control voltage deriving means 35 of the voltage detecting means 11 to all phases of the power source as shown, its energy storage element (shown as a capacitor 81) is sufficiently charged to operatively energize the voltage indicating signal emitting means 38 each time the switch means 37 is actuated even though in this setting there is negligible voltage across a valve during most of its reverse half cycle. In the absence of any voltage indicating signal from the emitting means 38, disabling means 82 will be activated by a NOT logic means 83. The control means 84 is now prevented from effecting premature operation of the gate pulse generating means 85 even if a gate pulse is being commanded by the firing angle varying means 86 of the control means. As soon as the voltage detecting means emits a voltage indicating signal, it is known that the controlled valve is in a blocking state and the control means is then allowed to function normally. Line 87 in FIG. 6 represents conventional means for synchronizing the operation of the gate pulse generator 85 with the alternating voltage of the polyphase power source.

Another possible modification of the voltage detecting means has been depicted in FIG. 5. This embodiment is arranged to emit a single indicating signal 60 when all three "odd" numbered valves 1F, 3F, and 5F of the bridge 8F are concurrently subject to voltages in excess of the threshold level, which condition obtains only while each of these valves is in its blocking state. This signal is fed to a NAND circuit in the state detector 17 that responds to its absence by providing a "1" signal at 41 (see FIG. 3), whereby an output signal 46A is produced so long as any one of the odd valves 1F, 3F, or 5F is actually conducting. Preferably another indicating signal from similar voltage detecting means associated with the three "even" valves 4F, 6F, and 2F of the bridge 8F is fed to the same NAND circuit so that the output signal 46A reflects forward current conduction by any one valve of the bridge. (Persons skilled in the art will recognize that for a short time near the end of a conducting period load current can continue flowing through the illustrated bridge with only one of its valves turned on because of the transient path provided by the snubber circuit around the penultimately conducting valves.)

As is shown in FIG. 5, the modified voltage detecting means comprises bipolarity level detecting means 64 connected via a resistor 61a between the terminals A and X for providing a first signal at an input terminal 11a of AND logic means 62 when the absolute magnitude of voltage across the valve 1F exceeds the predetermined threshold level. Separate but duplicate level detectors (not shown) are connected across the valves 3F and 5F via resistors 61b and 61c, respectively, and they are also operative to provide similar signals at terminals 13a and 15a, respectively, when the corresponding voltages exceed the threshold level. The AND logic symbol 62 represents an arrangement whereby gating means 63 is activated or released only so long as all three level detectors are concurrently operative, at which time the gate 63 is able to actuate switching means 67 which connects one side of indicating signal emitting means 68 to a relatively positive control voltage conductor 66a. The other side of the means 68 is coupled via a diode 69 to a common control voltage conductor 66b which is connected directly to the terminal X as shown. The means 68 preferably comprises a simple light emitting diode, and suitable means (not shown) is provided for converting its light signal to a relatively low-potential electrical indicating signal for feeding the NAND circuit in the associated state detector 17.

When the switching means 67 is actuated, it causes the indicating signal emitting means 68 to be energized by the control voltage that is provided across the pair of conductors 66a and 66b, whereupon the indicating signal 60 is produced. It should be noted that in this embodiment of our invention the respective level detectors are also powered by the control voltage taken from the conductors 66a and 66b. This control voltage is derived from the alternating voltage system by way of the block 65 which represents energy storage means (e.g., a capacitor) coupled to all three phases A, B, and C through half-wave rectifiers 70a, 70b, and 70c, respectively. These rectifiers are poled so that the means 65 is charged during periods of forward voltage across any of the three valves 1F, 3F, and 5F in their blocking states.

The voltage detecting means shown in FIG. 5 also includes a set of redundant components which have been identified by primed reference numbers. The half-wave rectifier 70a', 70b' and 70c' are poled so that the redundant energy storage means 65' is charged during periods of reverse voltage across any of the three valves 1F, 3F and 5F when blocking. The means 65' provides a control voltage across conductor 66b and 66c, with the latter conductor of this pair being at a negative potential with respect to the former. The control voltage is applied to the previously described indicating signal emitting means 68 via the diode 69' and switching means 67', the latter being actuated by gating means 63' when released by the concurrent presence of signals at terminals 11b, 13b and 15b. These signals are provided on operation of level detecting means 64' connected across the valve 1F and of duplicate level detectors (not shown) correspondingly connected across the other odd-numbered valves 3F and 5F so long as the voltages impressed on the respective valves are higher than the predetermined threshold level.

The indicating signal emitting means 68 is operatively energized on actuation of either or both of the switching means 67 and 67'. Redundancy is provided to ensure faithful operation of the FIG. 5 voltage detecting means in all foreseeable circumstances. Under certain operating conditions in electric power conversion apparatus of the cycloconverter type, there is a possibility that the energy storage means 65' will not be sufficiently recharged by reverse voltage across the blocking valves to sustain the required control voltage across conductors 66c and 66b, but in this event there is always adequate recharging of the companion means 65 and the control voltage available across conductors 66a and 66b ensures proper performance by the voltage detector.

While we have shown and described several forms of our invention by way of illustration, other modifications will no doubt occur to those skilled in the art. We therefore intend herein to cover all such modifications as fall within the true spirit and scope of the invention.

What we claim as new and desire to secure by Letters Patent of the Unites States is:

1. Means for monitoring the state of a periodically conducting electric valve adapted to be serially connected in an electric power circuit between a load and an alternating voltage system and arranged to be cyclically switched from a blocking state to a forward current conducting state in response to gate pulses generated by associated control means, comprising:

a. voltage detecting means connected across said valve for comparing a signal proportional to the instantaneous magnitude of voltage across the valve with a predetermined reference signal representative of a threshold voltage level which is higher than the voltage drop across the valve when conducting and for emitting a signal indicating whether or nor said instantaneous magnitude exceeds said threshold level; and b. logic means responsive to said indicating signal for producing a predetermined output signal so long as said valve is in a conducting stage, said logic means including means coupled to said associated control means and responsive to the generation of said gate pulses for preventing the production of said predetermined output signal when the valve is in its blocking state and the instantaneous magnitude of voltage thereacross does not exceed said threshold level.

2. The monitoring means of claim 1 in which said logic means includes means for delaying the termination of said output signal for a predetermined interval of time at the conclusion of each conducting period.

3. Means for monitoring the state of a periodically conducting electric valve adapted to be serially connected in an electric power circuit between a load and an alternating voltage system and arranged to be cyclically switched from a blocking state to a forward current conducting state in response to gate pulses generated by associated control means, comprising:

a. voltage detecting means comprising first means connected across said valve for comparing a signal proportional to the instantaneous magnitude of voltage across the valve with a predetermined reference signal representative of a threshold voltage level which is higher than the voltage drop across the valve when conducting, said first means being operative to provide a first signal whenever said instantaneous magnitude exceeds said threshold level, second means for providing a continuously available control voltage, third means for emitting a signal indicating that said instantaneous magnitude exceeds said threshold level, said indicating signal being electrically insulated from said first signal and from said control voltage, and fourth means connected between said second and third means and controlled by said first signal for causing said control voltage to energize said third means; and b. logic means coupled to both said voltage detecting means and said associated control means and responsive to said indicating signal and to the generation of said gate pulses for producing a predetermined output signal so long as said valve is in its conducting state.

4. The monitoring means of claim 1 in which said fourth means causes said control voltage to energize said third means on operation of said first means, and in which said logic means produces said output signal in response to the absence of said indicating signal and, concurrently, either the generation of a gate pulse or the presence of said output signal.

5. The monitoring means of claim 3 in which said second means comprises:

a. energy storage means, b. charging means coupled to said valve for supplying said energy storage means with energy derived from the electric power circuit, and c. means for isolating said first means from said energy storage means.

6. The monitoring means of claim 3 in which said second means comprises a capacitor connected by means of a charging circuit across said valve so as to be charged 7. Means for monitoring the state of a periodically conducting electric valve having a pair of main electrodes adapted to be serially connected in an electric power circuit including a load and one phase of a polyphase alternating voltage source and being arranged to be cyclically switched from a blocking state to a conducting state in response to gate pulses generated by associated control means, comprising:

a. level detecting means connected across said main electrodes of the valve and operative to provide a first signal only when the instantaneous magnitude of voltage across the valve exceeds a predetermined threshold level which is higher than the voltage drop across the valve when conducting;

b. means for deriving a control voltage from said source, said control voltage deriving means including a capacitor coupled to all phases of the source and arranged to be charged therefrom while the instantaneous magnitude of source voltage is higher than an amount equivalent to the magnitude of said control voltage and to sustain said control voltage during any interval when the instantaneous magnitude of source voltage is lower than said amount;

c. means for emitting an indicating signal when energized by said control voltage;

d. switching means connected between said signal emitting means and capacitor and controlled by said first signal for causing said control voltage to energize said emitting means; and e. logic means having one input for receiving said indicating signal and having a second input responsive to the generation of said gate pulses, said logic means being dependent upon the contemporaneous states of both inputs for producing a predetermined output signal so long as said valve is in its conducting state.

8. The subject matter of claim 7 arranged to monitor the states of a plurality of electric valves which have corresponding first main electrodes connected in common to one side of the load and corresponding second main electrodes connected individually to the respective phases of the polyphase source, wherein:

there is a separate level detecting means connecting across each of the respective valves, said switching means causes said control voltage to energize said indicating signal emitting means on concurrent operations of all of the level detecting means, and said logic means produces said output signal in response to the absence of said indicating signal and, concurrently, either the generation of a gate pulse or the presence of said output signal.

9. For use in conjunction with electric power conversion apparatus comprising a group of periodically conducting electric valves connected in a bridge configuration between a-c and d-c terminals, with a first one of said valves having its anode connected to a first a-c terminal and having its cathode connected to the positive d-c terminal of the bridge and with a second one of said valves having its anode connected to a different a-c terminal and its cathode connected to said positive d-c terminal, said a-c terminals being adapted to be connected to a polyphase alternating voltage system, and triggering means for cyclically generating a family of gate pulses and for sequentially applying said gate pulses to the respective valves of the bridge so as to trigger each valve from a blocking to a forward conducting state in synchronism with said alternating voltage, the forward current conducting period of each valve in turn being followed immediately by an interval of reverse voltage across the valve, improved means for monitoring the state of said bridge comprising:

a. first means connected across said first valve and operative to provide a first signal when the instantaneous magnitude of voltage across that valve exceeds a predetermined threshold level which is higher than the voltage drop across the valve when conducting;

b. second means connected across said second valve and operative to provide a second signal when the instantaneous magnitude of voltage across the second valve exceeds said threshold level;

c. means controlled by said first and second signals for emitting a first indicating signal when said first and second means are concurrently operative, said indicating signal emitting means being unable to emit said first indicating signal in the absence of either said first signal or said second signal; and d. logic means coupled to the last-mentioned means and to said triggering means for producing a predetermined output signal in response to the absence of said first indicating signal and, concurrently, either the generation of any one of said gate pulses or the presence of said output signal, whereby said output signal is produced so long as either said first or second valve is conducting.

10. The subject matter of claim 9 wherein the apparatus comprises two groups of valves forming first and second duplicate bridges, with the positive d-c terminal of the first bridge being connected to the negative d-c terminal of the second bridge, and additional means for sequentially triggering the valves of the second bridge; wherein first and second means are provided for monitoring the states of the first and second bridges, respectively; and wherein there is provided means responsive to the output signal produced by the logic means of the second monitoring means for preventing the application of gate pulses to the valves of the first bridge.

11. The subject matter of claim 10 wherein the negative d-c terminal of the first bridge is connected to the positive d-c terminal of the second bridge, and wherein means is provided for preventing the application of gate pulses to the valves of the second bridge while the logic means of the first monitoring means is producing an output signal.

12. The subject matter of claim 9 wherein the apparatus comprises two groups of valves forming first and second duplicate bridges, with a first one of the valves of the second bridge being connected in inverse-parallel relationship with said first valve of the first bridge and a second one of the valves of said second bridge being connected in inverse-parallel relationship with said second valve of the first bridge, additional means for sequentially triggering the valves of the second bridge and means for alternatively activating the original and the additional triggering means, wherein the first and second means of the improved monitoring means are operative to provide their respective signals when there is voltage of either polarity across the respectively associated valves and the absolute magnitude thereof exceeds said threshold level; wherein said logic means is also coupled to said additional triggering means and is arranged to produce another output signal in response to the absence of said first indicating signal and, concurrently, either the triggering of a valve of the second bridge or the presence of said other output signal, whereby said other output signal is produced so long as either of the first and second valves of the second bridge is conducting; and wherein there are provided means responsive to said predetermined output signal for preventing the application of gate pulses to the valves of the second bridge and means responsive to said other output signal for preventing the application of gate pulses to the valves of the first bridge.

13. For use in conjunction with electric power conversion apparatus comprising a group of periodically conducting electric valves connected in a bridge configuration between a-c and d-c terminals, with the first one of said valves having its cathode connected to the positive d-c terminal of the bridge, a second one of said valves having its anode connected to a different a-c terminal and its cathode connected to said positive d-c terminal, a third one of said valves having its anode connected to the negative d-c terminal of the bridge and its cathode connected to said first a-c terminal, and a fourth one of said valves having its anode connected to said negative d-c terminal and its cathode connected to said different a-c terminal, said a-c terminals being adapted to be connected to a polyphase alternating voltage system, and triggering means for cyclically generating a family of gate pulses and for sequentially applying said gate pulses to the respective valves of the bridge so as to trigger each valve from a blocking to a forward conducting state in synchronism with said alternating voltage, the forward current conducting period of each valve in turn being followed immediately by an interval of reverse voltage across that valve, improved means for monitoring the state of said bridge comprising:

a. first means connected across said first valve and operative to provide a first signal when the instantaneous magnitude of voltage across that valve exceeds a predetermined threshold level which is higher than the voltage drop across the valve when conducting;

b. second means connected across said second valve and operative to provide a second signal when the instantaneous magnitude of voltage across the second valve exceeds said threshold level;

c. means controlled by said first and second signals for emitting a first indicating signal when said first and second means are concurrently operative;

d. third means connected across said third valve and operative to provide a third signal when the instantaneous magnitude of voltage across said third valve exceeds said threshold level, e. fourth means connected across said fourth valve and operative to provide a fourth signal when the instantaneous magnitude of voltage across said fourth valve exceeds said threshold level, f. means controlled by said third and fourth signals for emitting a second indicating signal when said third and fourth means are concurrently operative; and g. logic means coupled to said triggering means and to both of said indicating signal producing means for producing a predetermined output signal in response to the absence of either of said first and second indicating signals and, concurrently, either the generation of any one of said gate pulses or the presence of said output signal, whereby said output signal is produced so long as one of said first, second, third, and fourth valves is conducting.

14. Means for detecting the presence of voltage across a thyristor comprising:

a. level detecting means conductively connected across the thyristor and operative to produce a first signal when there is voltage of either polarity across the thyristor and the absolute magnitude thereof exceeds a predetermined threshold level which is higher than the voltage drop across the thyristor when in its forward current conducting state;

b. means including a capacitor connected across the thyristor for providing a continuously available control voltage, said capacitor being charged by voltage across the thyristor when in its blocking state;

c. means for producing a second signal when energized by said control voltage, said second signal being electrically insulated from said first signal and said control voltage; and d. switching means controlled by said first signal for causing said control voltage to energize said second signal producing means on operation of said level detecting means.

15. In combination:

a. a periodically conducting thyristor having a pair of main electrodes adapted to be serially connected in an electric power circuit including a load and one phase of a polyphase alternating voltage source;

b. gate pulse generating means operative on command to generate a gate pulse for triggering said thyristor;

c. control means for cyclically effecting operation of said gate pulse generating means in synchronism with said alternating voltate, said control means including means for varying the time at which said control means commands operation of said gate pulse generating means each cycle;

d. level detecting means connected across the main electrodes of said thyristor and operative whenever the instantaneous magnitude of voltage across the thyristor exceeds a predetermined threshold level which is higher than the voltage drop across the thyristor when conducting;

e. means for deriving a control voltage from said source, said control voltage deriving means including an energy storage component coupled to all phases of the source and arranged to be charged therefrom while the instantaneous magnitude of source voltage is higher than an amount equivalent to the magnitude of said control voltage and to sustain said control voltage during any interval when the instantaneous magnitude of source voltage is lower than said amount;

f. means operatively energized solely by said control voltage for emitting a voltage indicating signal when so energized;

g. switching means connected between said control voltage deriving means and said signal emitting means for causing said control voltage to energize said last-mentioned means on operation of said level detecting means; and h. logic means coupled to both said control means and said voltage indicating signal emitting means for preventing said control means from effecting operation of said gate pulse generating means in the absence of a voltage indicating signal.

* * * * *